(No Model.)
A. A. FOOS.
DINNER PAIL.
No. 294,217. Patented Feb. 26, 1884.
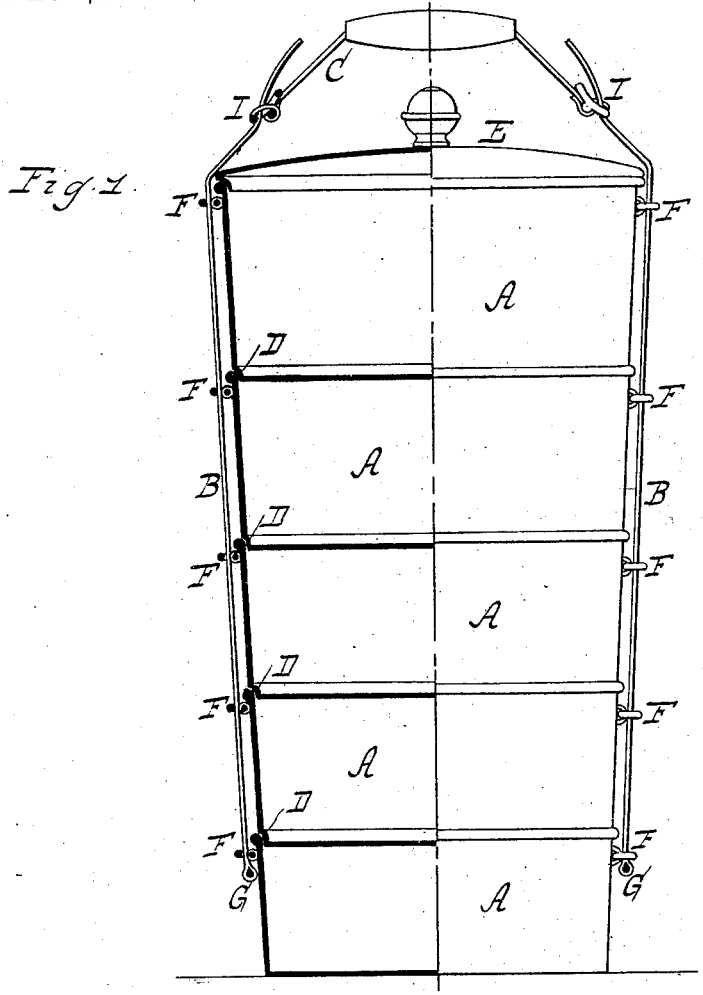
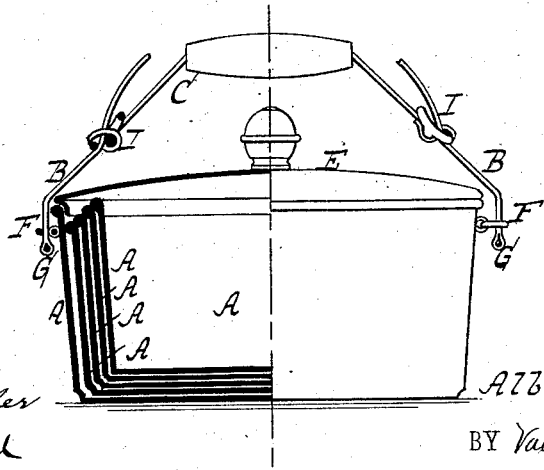
WITNESSES:
William Miller
Otto Hufeland
INVENTOR
Albert A Foos
BY VanSantvoord & Hauff
his ATTORNEYS

UNITED STATES PATENT OFFICE.

ALBERT A. FOOS, OF BROOKLYN, NEW YORK.

DINNER-PAIL.

SPECIFICATION forming part of Letters Patent No. 294,217, dated February 26, 1884.

Application filed August 8, 1883. (No model.)

*To all whom it may concern:*

Be it known that I, ALBERT A. FOOS, a citizen of the United States, residing at Brooklyn, in the county of Kings and State of New York, have invented new and useful Improvements in Dinner-Pails, of which the following is a specification.

This invention relates to that class of dinner-pails in which a series of superposed pans are held by side supporting-straps; and it has for its object to so construct such pails that the pans may be nested or placed into each other for convenience of transportation when not in use, to which end it consists in tapering the pans continuously from the top to the bottom of the series. Each pan has side loops to receive the supporting-straps, which latter have stops at the lower end and connect at the upper end with a handle-strap, as hereinafter more fully set forth.

This invention is illustrated in the accompanying drawings, in which Figure 1 shows one half of the pail in side view, and the other half in vertical section, when the pans are in position for use. Fig. 2 corresponds to Fig. 1 when the pans are nested.

Similar letters indicate similar parts.

The letter A designates the pans, each of which is provided with a bottom, so that it can receive and hold a dish or other article, and all the pans are independent, so that they can be removed from each other and placed one within the other, while, when they are in use, as hereinafter explained, the bottom of one pan constitutes a cover for the upper end of the pan directly below it; B, the supporting-straps, and C the handle-strap. Each of the pans, except the lower one, is provided with a shoulder, D, on the lower edge, whereby it rests on the upper edge of the pan beneath it, when the pans are superposed or placed on each other, as shown in Fig. 1, and the upper pan is provided with a lid, E.

By referring to Fig. 1 it will be seen that the series of pans taper continuously from the top to the bottom member of the series, and by this means the pans are adapted to be nested, as shown in Fig. 2, so that when not in use they occupy the least possible space. The supporting-straps B are drawn upward through loops F, which are on the side of each of the pans A, diametrically opposite to each other, and the lower ends of the straps are provided with stops G, to abut against the loops—namely, those of the lower pan—these stops being formed by doubling the straps at the required points, while the upper ends of the straps are connected to the handle-strap C, as by buckles I.

By arranging the loops F on each of the pans, one or more of the pans may be omitted, beginning at the bottom of the series, while by the handle-strap C the supporting-straps can be readily adapted to the number of the pans.

I am aware that it is not broadly new to construct a dinner-pail of a series of superposed pans; and I am also aware that a dinner-pail has been composed of rings decreasing in diameter downward and extensible or contractible like a telescope; but such do not constitute my invention.

What I claim as new, and desire to secure by Letters Patent, is—

1. A dinner-pail consisting of a series of superposed detachable pans tapering continuously from the top to the bottom member, to adapt them to be nested or placed one within the other, each pan having a bottom which forms a cover to the upper end of the pan beneath it, substantially as described.

2. The combination, substantially as hereinbefore set forth, of the series of superposed pans tapering continuously from the top to the bottom member of the series, and each having side loops diametrically opposite each other, and the supporting-straps having their lower ends provided with stops to abut against such loops.

3. The combination, substantially as hereinbefore set forth, of the series of superposed pans tapering continuously from the top to the bottom member of the series, and each having side loops diametrically opposite each other, the supporting-straps having their lower ends provided with stops to abut against such loops, and the handle-strap having the upper ends of the supporting-straps connected to it.

In testimony whereof I have hereunto set my hand and seal in the presence of two subscribing witnesses.

ALBERT A. FOOS. [L. S.]

Witnesses:
CHAS. WAHLERS,
E. F. KASTENHUBER.